United States Patent
Huang

(10) Patent No.: US 10,310,569 B2
(45) Date of Patent: Jun. 4, 2019

(54) SINGLE PIECE WATER RESISTANCE DOOR

(71) Applicant: Getac Technology Corporation, Hsinchu County (TW)

(72) Inventor: Tzu-Chiu Huang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 320 days.

(21) Appl. No.: 14/610,322

(22) Filed: Jan. 30, 2015

(65) Prior Publication Data

US 2016/0122094 A1    May 5, 2016

(30) Foreign Application Priority Data

Oct. 30, 2014    (CN) .......................... 2014 1 0597326

(51) Int. Cl.
| | |
|---|---|
| H04M 1/02 | (2006.01) |
| G06F 1/18 | (2006.01) |
| G06F 1/16 | (2006.01) |
| H04M 1/18 | (2006.01) |

(52) U.S. Cl.
CPC ............ G06F 1/182 (2013.01); G06F 1/1656 (2013.01); H04M 1/18 (2013.01); H04M 1/0274 (2013.01)

(58) Field of Classification Search
CPC ............ B65D 47/0847; B01L 3/50825; H01R 13/443; H01R 13/5216

USPC .................................................. 220/305
See application file for complete search history.

(56) References Cited

U.S. PATENT DOCUMENTS

| | | | | | |
|---|---|---|---|---|---|
| 4,236,653 | A | * | 12/1980 | Gach ................. | B65D 47/0838 222/153.14 |
| 4,713,219 | A | * | 12/1987 | Gerken .............. | B01L 3/50825 215/237 |
| 4,795,043 | A | * | 1/1989 | Odet .................. | B65D 51/224 215/235 |
| 4,901,892 | A | * | 2/1990 | Song .................. | B65D 47/0847 222/498 |
| 7,762,438 | B2 | * | 7/2010 | Skillin .............. | B65D 47/0819 215/245 |

* cited by examiner

*Primary Examiner* — Andrew T Kirsch
(74) *Attorney, Agent, or Firm* — Locke Lord LLP; Tim Tingkang Xia, Esq.

(57) ABSTRACT

A single piece water resistance door suitable for being fixed to a casing of a connector module is provided. The casing includes a first engagement part and an opening adjacent to the first engagement part. The single piece water resistance door includes a fixing part suitable for being fixed to the casing and having a first portion and a body rotatably connected to the fixing part to cover the opening. A space is between the first portion and the casing. The body includes at least one second engagement part. When the second engagement part is engaged with the first engagement part, the casing and the body press against each other, and the body covers the opening. When a force is applied to the first portion, the first portion is moved to the space and moves the body, so that the second engagement part is released from the first engagement part.

13 Claims, 3 Drawing Sheets

SINGLE PIECE WATER RESISTANCE DOOR

CROSS-REFERENCE TO RELATED APPLICATIONS

This non-provisional application claims priority under 35 U.S.C. § 119(a) on Patent Application No(s). 201410597326.7 filed in China on Oct. 30, 2014, the entire contents of which are hereby incorporated by reference.

FIELD OF THE INVENTION

The invention relates to a water resistance door and particularly relates to a single piece water resistance door.

DESCRIPTION OF RELATED ART

At present, portable electronic devices that meet the industrial or military specifications are mostly characterized by water resistance, which may be achieved by arranging water resistance doors outside connector modules, so as to prevent external liquid from entering into the portable electronic devices through the connector modules.

Generally, the method of opening the water resistance door is the same as the method of closing the water resistance door. For instance, a protruding puller is often arranged on the water resistance door, so as to allow a user to open the door in a direction or close the door in an opposite direction. To assist the user in opening the water resistance door, the puller need be of certain size; however, if the portable electronic device is accidentally dropped, the protruding puller is very much likely to withstand the hitting force, such that the water resistance door is damaged.

SUMMARY OF THE INVENTION

The invention is directed to a single piece water resistance door that may not be equipped with any pulling arms, and the single piece water resistance door can be opened or closed in different ways.

In an embodiment of the invention, a single piece water resistance door suitable for being fixed to a casing of a connector module is provided. The casing includes a first engagement part and an opening adjacent to the first engagement part. The single piece water resistance door includes a fixing part and a body. The fixing part is suitable for being fixed to the casing. Besides, the fixing part has a first portion closed to the body, and a space exists between the first part and the casing. The body is rotatably connected to the fixing part to cover the opening. The body includes at least one second engagement part corresponding to the first engagement part. When the second engagement part is engaged with the first engagement part, the casing and the body press against each other, and the body covers the opening. When a force is applied to the first portion of the fixing part, the first portion is moved to the space and drives the body to move, so that the second engagement part is released from the first engagement part.

According to an embodiment of the invention, the second engagement part is a locking hook, and the locking hook is oriented toward a direction opposite to a direction in which the force is applied to the first portion.

According to an embodiment of the invention, the second engagement part is a locking hook, and a depth of the space is greater than a depth of the locking hook.

According to an embodiment of the invention, the single piece water resistance door further includes an elastic member. The casing includes a ring-shaped stopper that surrounds the opening, and the elastic member is placed at the body corresponding to the ring-shaped stopper.

According to an embodiment of the invention, the single piece water resistance door further includes an elastic member. The body includes a ring-shaped stopper. When the second engagement part is engaged with the first engagement part, the ring-shaped stopper covers peripheries of the opening, and the elastic member is placed at the casing corresponding to the ring-shaped stopper.

According to an embodiment of the invention, the single piece water resistance door further includes a pivot part that is arranged between the fixing part and the body.

According to an embodiment of the invention, the fixing part, the pivot part, and the body are integrally formed, and a thickness of the pivot part is less than a thickness of the fixing part and less than a thickness of the body.

According to an embodiment of the invention, the body further includes a puller that is arranged away from the fixing part.

According to an embodiment of the invention, the casing and the body further include a plurality of strengthened ribs respectively connected to the first engagement part and the second engagement part.

According to an embodiment of the invention, a material of the single piece water resistance door is plastic.

In view of the above, if a user intends to close the single piece water resistance door, the user is merely required to rotate the body described herein, such that the second engagement part is engaged with the first engagement part. By contrast, if the user intends to open the single piece water resistance door, the sufficient space between the first portion of the fixing part and the casing allows the first portion of the fixing part to be pressed down, such that the first portion is moved toward the space between the first portion and the casing; thereby, the body can be moved, and the second engagement part can accordingly be released from the first engagement part. That is, the single piece water resistance door described herein can be opened in different ways, and it is not necessary to equip the single piece water resistance door with a puller on the body; as such, the possibility of impairing the single piece water resistance door through dropping can be reduced.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
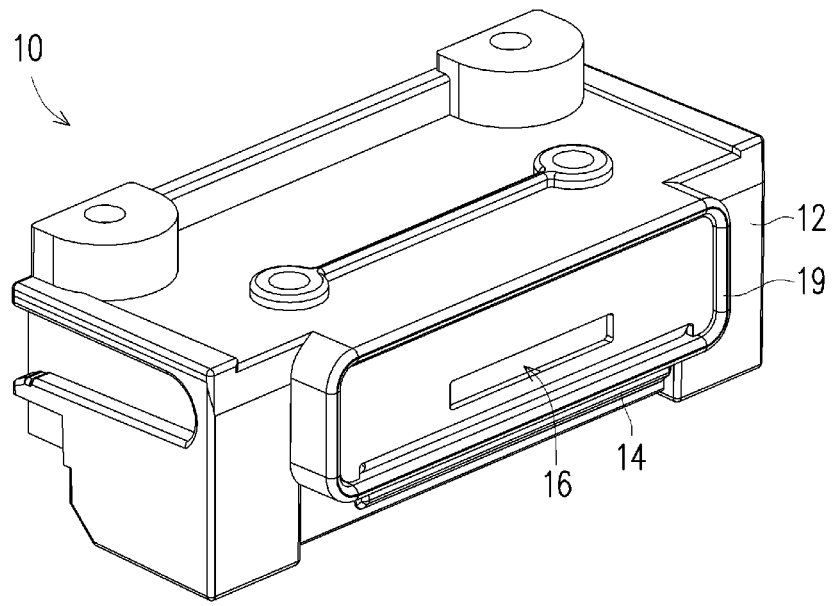
FIG. 1 is a schematic diagram illustrating a casing of a connector module.
Figure 2:
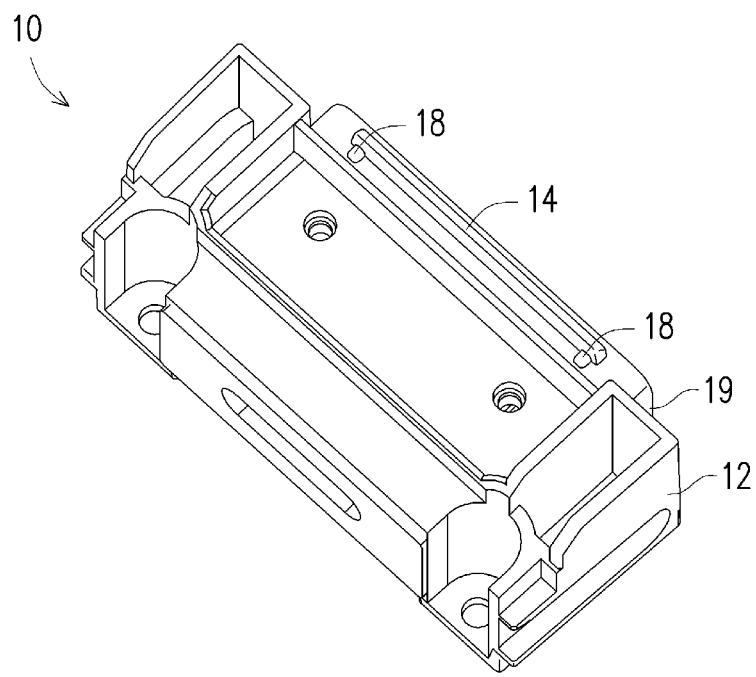
FIG. 2 is a schematic diagram of FIG. 1 at another view angle.

FIG. 1 is a schematic diagram illustrating a casing of a connector module. FIG. 2 is a schematic diagram of FIG. 1 at another view angle. In FIG. 1 and FIG. 2, a casing 12 of a connector module 10 is depicted, and the single piece water resistance door provided herein can be arranged on the casing 12. The connector module 10 may be arranged on a portable electronic device (not shown), such that the connector module 10 and an external connector may be connected to each other. A water resistance layer may be arranged between the connector module 10 and the portable electronic device, so as to prevent external liquid from entering the portable electronic device through a gap between the connector module 10 and the portable electronic device. The casing 12 includes a first engagement part 14 and an opening 16 adjacent to the first engagement part 14. In the present embodiment, the connector module 10 may be a car reader, while the type of the connector module 10 is not limited in the invention. In the present embodiment, the first engagement part 14 is arranged, so that the single piece water resistance door 100 can be engaged with the first engagement part 14. The opening 16 can be inserted by a memory card (not shown) or a chip card (not shown), whereas the functions of the first engagement part 14 and the opening 16 are not limited to those provided herein.

As shown in FIG. 2 and described in the present embodiment, in order to enhance the structural strength of the casing 12 around the first engagement part 14, the casing 12 is equipped with a plurality of strengthened ribs 18 connected to the first engagement part 18. The extension direction of the strengthened ribs 18 is perpendicular to the first engagement part 14, so as to enhance the strength of the first engagement part 14. Certainly, the position, the extension direction, and the number of the strengthened ribs 18 can be adjusted according to actual design requirements and should not be limited to those illustrated in the drawings.

Figure 3:
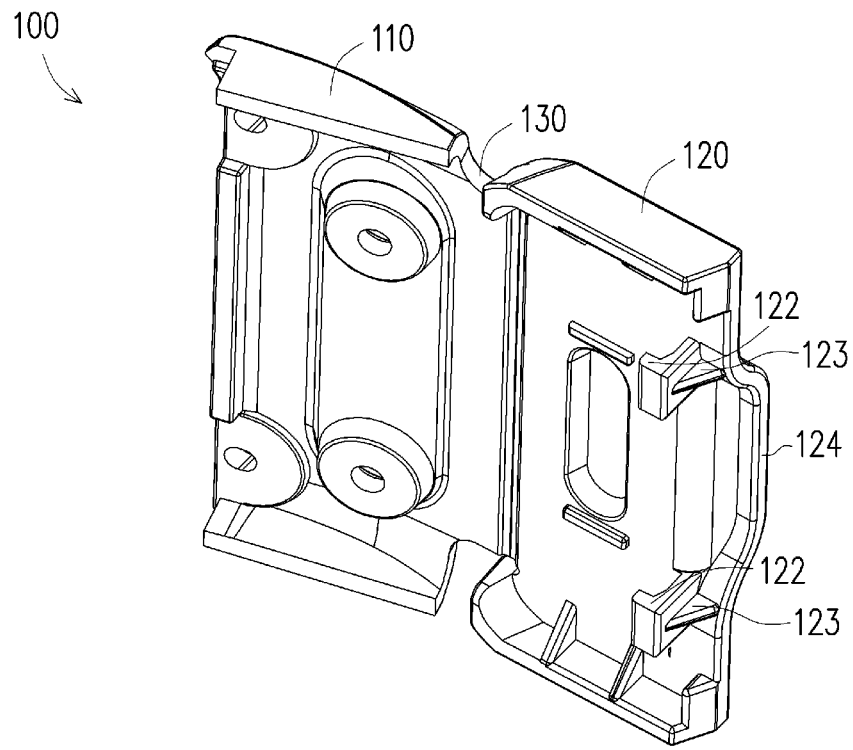
FIG. 3 is a schematic diagram illustrating a single piece water resistance door according to an embodiment of the invention.
Figure 4:
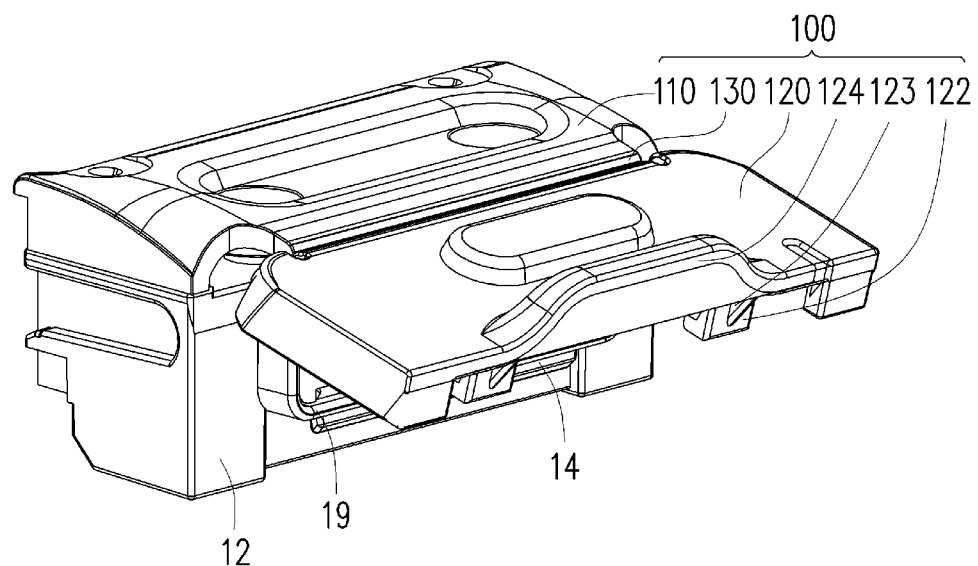
FIG. 4 schematically illustrates the single piece water resistance door depicted in FIG. 3 and arranged on the casing shown in FIG. 1, and the single piece water resistance door is not yet closed.
Figure 5:
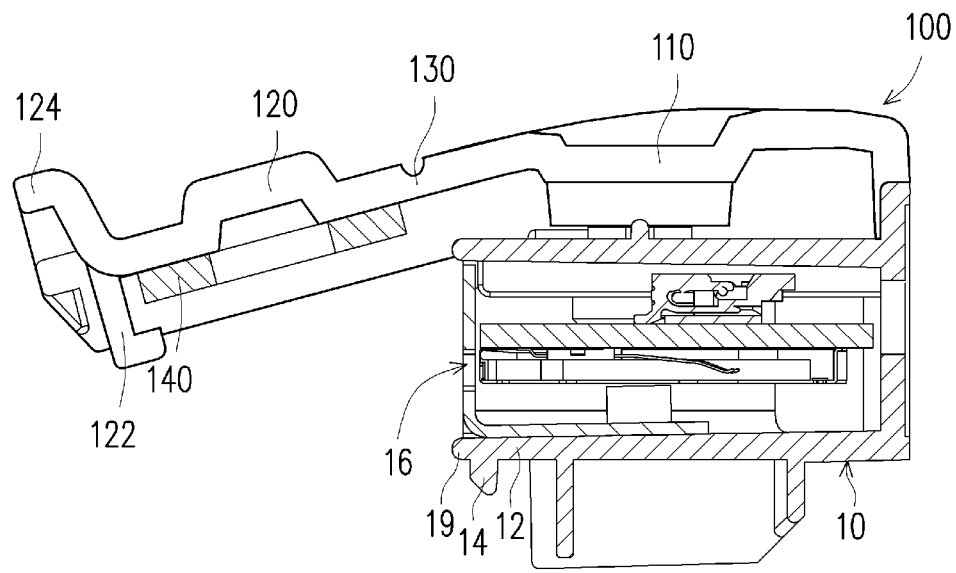
FIG. 5 is a schematic diagram of FIG. 3 at another view angle.

FIG. 3 is a schematic diagram illustrating a single piece water resistance door according to an embodiment of the invention. FIG. 4 schematically illustrates the single piece water resistance door depicted in FIG. 3 and arranged on the casing shown in FIG. 1, and the single piece water resistance door is not yet closed. FIG. 5 is a schematic diagram of FIG. 3 at another view angle. With reference to FIG. 3 to FIG. 5, the single piece water resistance door 100 provided in the present embodiment includes a fixing part 110, a body 120, a pivot portion 130, and an elastic member 140.

The fixing part 110 is suitable for being fixed to the casing 12. According to the present embodiment, the fixing part 110 is locked to the casing 12 by screws, which should however not be construed as a limitation to the invention. According to other embodiments, the fixing part 110 may be wedged in or adhered to the casing 12 in a secure manner.

The body 120 is rotatably connected to the fixing part 110 to cover the opening 16. To be specific, in the present embodiment, the pivot portion 130 is arranged between the fixing part 110 and the body 120, such that the body 120 is flexibly connected to the fixing part 110. According to the present embodiment, the fixing part 110, the pivot part 130, and the body 120 are integrally formed, and a thickness of the pivot part 130 is less than a thickness of the fixing part 110 and less than a thickness of the body 120; thereby, the body 120 can be easily bent relative to the fixing part 110. However, according to other embodiments of the invention, the fixing part 110, the pivot part 130, and the body 120 may be separated from one another; alternatively, the body 120 may be directly connected to the fixing part 110.

In the present embodiment, a material of the fixing part 110, the pivot part 130, and the body 120 may be plastic (e.g., polypropylene) that has adequate hardness and can be easily bent by a user according to the present embodiment; certainly, the material of the fixing part 110, the pivot part 130, and the body 120 is not limited thereto.

The body 120 includes at least one second engagement part 122; in the present embodiment, the number of the second engagement part 122 is two, and the two second engagement parts 122 respectively correspond to the first engagement part 14. The first and second engagement parts 14 and 122 may be locking hooks that can be locked to each other, whereas the type of the first and second engagement parts 14 and 122 is not limited thereto. In order to enhance the structural strength of the body 120 around the second engagement parts 122, the body 120 is equipped with a plurality of strengthened ribs 123 connected to the second engagement parts 122. The extension direction of the strengthened ribs 123 is perpendicular to the second engagement parts 122, so as to enhance the strength of the second engagement parts 122. Certainly, the position, the extension direction, and the number of the strengthened ribs 123 can be adjusted according to actual design requirements and should not be limited to those illustrated in the drawings.

With reference to FIG. 1 and FIG. 5, in the present embodiment, the casing 12 includes a ring-shaped stopper 19 that surrounds the opening 16. The elastic member 140 is placed on an inner side of the body 120, i.e., the side corresponding to the ring-shaped stopper 19 of the casing 12, and the location of the elastic member 140 on the body 120 corresponds to the location of the ring-shaped stopper 19. In the present embodiment, the elastic member 140 may be made of rubber, while the material of the elastic member 140 is not limited thereto; in other embodiments of the invention, the elastic member 140 may be made of foam, silica gel, or any other flexible material.

Figure 6:
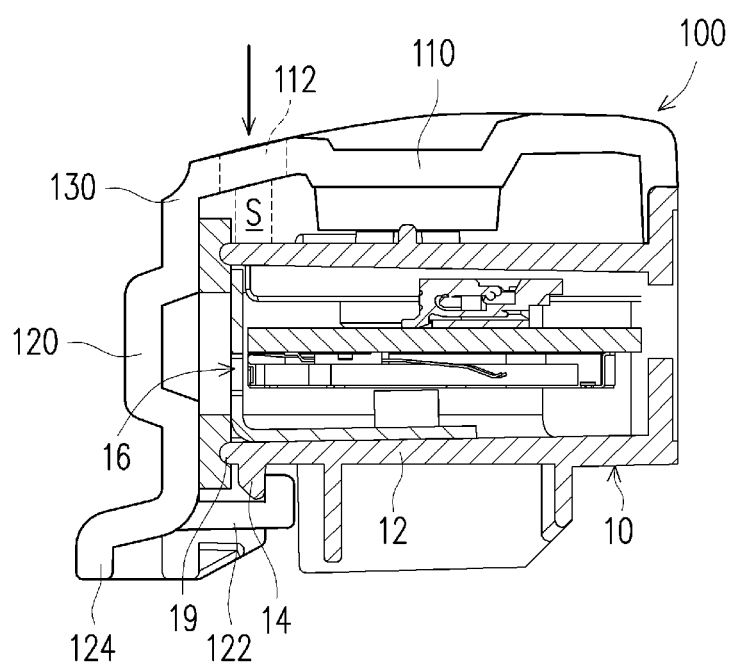
FIG. 6 schematically illustrates the single piece water resistance door depicted in FIG. 3 is closed at the casing depicted in FIG. 1.

If a user intends to close the single piece water resistance door, the user may rotate the body 120 counterclockwise shown in FIG. 5, such that the body 120 continues to approach the casing 12 until the second engagement parts 122 of the body 120 are engaged with the first locking part 14 of the casing 12 to cover the opening 16. FIG. 6 schematically illustrates the single piece water resistance door depicted in FIG. 3 is closed at the casing depicted in FIG. 1. As shown in FIG. 6, when the second engagement parts 122 of the body 120 are engaged with the first locking part 14, the casing 12 and the body 120 push against each other, and the body 120 covers the opening 16, so as to achieve effects of water resistance. In particular, the ring-shaped stopper 19 pushes against the elastic member 140, so as to prevent external liquid from entering the connector module 10 through the opening 16 and protect the connector module 10 from being damaged by moisture.

In another embodiment of the invention, the body 120 may include a ring-shaped stopper 19, and the elastic member 140 is placed at the casing 12 corresponding to the ring-shaped stopper 19. When the second engagement parts 122 are engaged with the first engagement part 14, the ring-shaped stopper 19 covers peripheries of the opening 16 to push against the elastic member 140, and thereby water can be precluded from entering the space between the single piece water resistance door 100 and the casing 12 and increasing the waterproof efficiency.

Through practical tests, the effects of water and dust resistance achieved by the single piece water resistance door 100 described herein can reach the IP65 level, i.e., the powder dust can be completely resisted. Even though the single piece water resistance door 100 is washed by water, no water is allowed to enter the single piece water resistance door 100.

As shown in FIG. 6, in the present embodiment, when the second engagement parts 122 of the body 120 are engaged with the first engagement part 14 of the casing 12, the fixing part 110 has a first portion 112 closed to the body 120, and a space S exists between the first portion 112 and the casing 12. In the present embodiment, the single piece water resistance door 100 is made of plastic (e.g., polypropylene) and is somehow flexible. When a force in a direction toward the bottom side shown in FIG. 6 is applied to the first portion 112 of the fixing part 110, the first portion 112 of the fixing part 110 is slightly deformed and is moved to the space S, and the first portion 112 of the fixing part 110 is moved in a downward direction, so as to drive the body 120 to move, such that the second engagement parts 122 are released from the first engagement part 14. At this time, the single piece water resistance door 100 returns to the state shown in FIG. 5 with respect to the casing 12.

That is, the single piece water resistance door 100 provided in the present embodiment has the simple structure and can still be easily opened or closed in different ways. Through rotating the body 120 of the single piece water resistance door 100, the user is able to engage the second engagement parts 122 of the body 120 with the first engagement part 14 of the casing 12, so as to close the single piece water resistance door 100. Besides, the user may move the body 120 through pressing the first portion 112 of the fixing part 110 of the single piece water resistance door 100, and thereby the second engagement parts 122 can be released from the first engagement part 14.

According to the present embodiment, in order that the user can easily open or close the single piece water resistance door 100, the body 120 may still be equipped with a puller 124 away from the fixing part 110; as such the user not only can press the first portion 112 but also can directly move the puller 124 to open the single piece water resistance door 100. Note that the puller 124 may be selectively omitted by designers, and the single piece water resistance door 100 described herein may not be equipped with the puller 124 which allows the user to exert a pulling force for opening or closing the body 120. Alternatively, the single piece water resistance door 100 may be equipped with a puller 124 that protrudes to a less extent, so as to reduce the possibility of impairing the single piece water resistance door 100 in the event that the single piece water resistance door 100 is dropped.

It should be mentioned that the material of the single piece water resistance door 100 is not limited to those provided above; as long as the material of the single piece water resistance door 100 has certain strength under normal circumstances, is somehow flexible, and can be deformed in a direction toward the space S after the first portion 112 of the fixing part 110 is pressed, so as to move the body 120 and allow the second engagement parts 122 to be released from the first engagement part 14, the material falls within the scope of protection described herein.

In the present embodiment, the direction where the second engagement parts 122 are oriented is opposite to the direction in which the force is applied to the first portion 112; particularly, as shown in FIG. 6, the direction in which the second engagement parts 122 are engaged with the first engagement part 14 is an upward direction, while the force is applied to the first portion 112 of the fixing part 110 in a downward direction. These two directions are opposite to each other. Hence, when the first portion 112 of the fixing part 110 is pressed down, and the second engagement parts 122 are moved in a downward direction, the second engagement parts 122 are not interfered and can be smoothly released from the first engagement part 14. In addition, a depth of the space S between the first portion 122 and the casing 12 is greater than a depth of each of the second engagement parts 122, so that the second engagement parts 122 can be moved in a downward direction to a sufficient extent.

To sum up, if a user intends to close the single piece water resistance door described herein, the user is merely required to rotate the body, such that the second engagement part can be engaged with the first engagement part. By contrast, if the user intends to open the single piece water resistance door, the sufficient space between the first portion of the fixing part and the casing allows the first portion of the fixing part to be pressed down, such that the first portion is moved toward the space; thereby, the body can be moved, and the second engagement part can accordingly be released from the first engagement part. That is, the single piece water resistance door described herein can be opened in different ways, and it is not necessary to equip the single piece water resistance door with a puller on the body; as such, the possibility of impairing the single piece water resistance door 100 through dropping can be reduced.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A single piece water resistance door suitable for being fixed to a casing of a connector module, the casing comprising a first engagement part and an opening adjacent to the first engagement part, the single piece water resistance door comprising:
    a body, adapted to cover the opening, and comprising at least one second engagement part corresponding to the first engagement part;
    an elastic member, wherein the casing comprises a flat surface enclosed by a ring-shaped stopper, the opening being provided on the flat surface, wherein the ring-shaped stopper surrounds the flat surface and the opening, covers peripheries of the opening and pushes against the elastic member, so as to prevent external liquid from entering the connector module through the opening, wherein each of the opening and the ring-shaped stopper is rectangular or rectangular with rounded corners; and
    a fixing part for being fixed to the casing, the fixing part having
        a first portion, adapted to move along a direction of a force applied on the first portion towards a space between the first portion and the casing, and connected to the body such that, when the force is applied on the first portion, the second engagement part is driven substantially along the direction of the force so as to be released from the first engagement part, wherein the body and the fixing part are rotatably connected to each other; and wherein when the second engagement part is engaged with the first engagement part, the casing and the body press against each other, and the body covers the opening.

2. The single piece water resistance door as recited in claim 1, wherein the second engagement part is a locking hook, and the locking hook is oriented toward a direction opposite to the direction of the force applied to the first portion.

3. The single piece water resistance door as recited in claim 1, wherein the second engagement part is a locking hook, and a depth of the space is greater than a depth of the locking hook.

4. The single piece water resistance door as recited in claim 1,
the elastic member is placed at the body corresponding to the ring-shaped stopper.

5. The single piece water resistance door as recited in claim 1,
wherein when the second engagement part is engaged with the first engagement part, the elastic member is placed at the casing corresponding to the ring-shaped stopper.

6. The single piece water resistance door as recited in claim 1, further comprising:
a pivot part arranged between the fixing part and the body.

7. The single piece water resistance door as recited in claim 6, wherein the fixing part, the pivot part, and the body are integrally formed, and a thickness of the pivot part is less than a thickness of the fixing part and less than a thickness of the body.

8. The single piece water resistance door as recited in claim 1, wherein the body further comprises a puller away from the fixing part.

9. The single piece water resistance door as recited in claim 1, wherein the casing and the body further comprise a plurality of strengthened ribs respectively connected to the first engagement part and the second engagement part.

10. The single piece water resistance door as recited in claim 1, wherein a material of the single piece water resistance door is plastic.

11. The single piece water resistance door as recited in claim 1, wherein the body is equipped with a puller away from the fixing part so that a user presses the first portion and directly moves the puller to open the single piece water resistance door.

12. The single piece water resistance door as recited in claim 1, wherein when the force is applied to the first portion of the fixing part, the first portion of the fixing part is deformed and is moved to the space, and is moved in a downward direction, so as to drive the body to move such that the second engagement part is released from the first engagement part.

13. The single piece water resistance door as recited in claim 1, wherein the body is equipped with a puller away from the fixing part, and the puller is protruded from a surface of the body so that a user directly moves the puller to open the body.

* * * * *